S. J. PARKER.
Preserving Fruit in Jars, &c.
No. 41,392.  Patented Jan. 26, 1864.
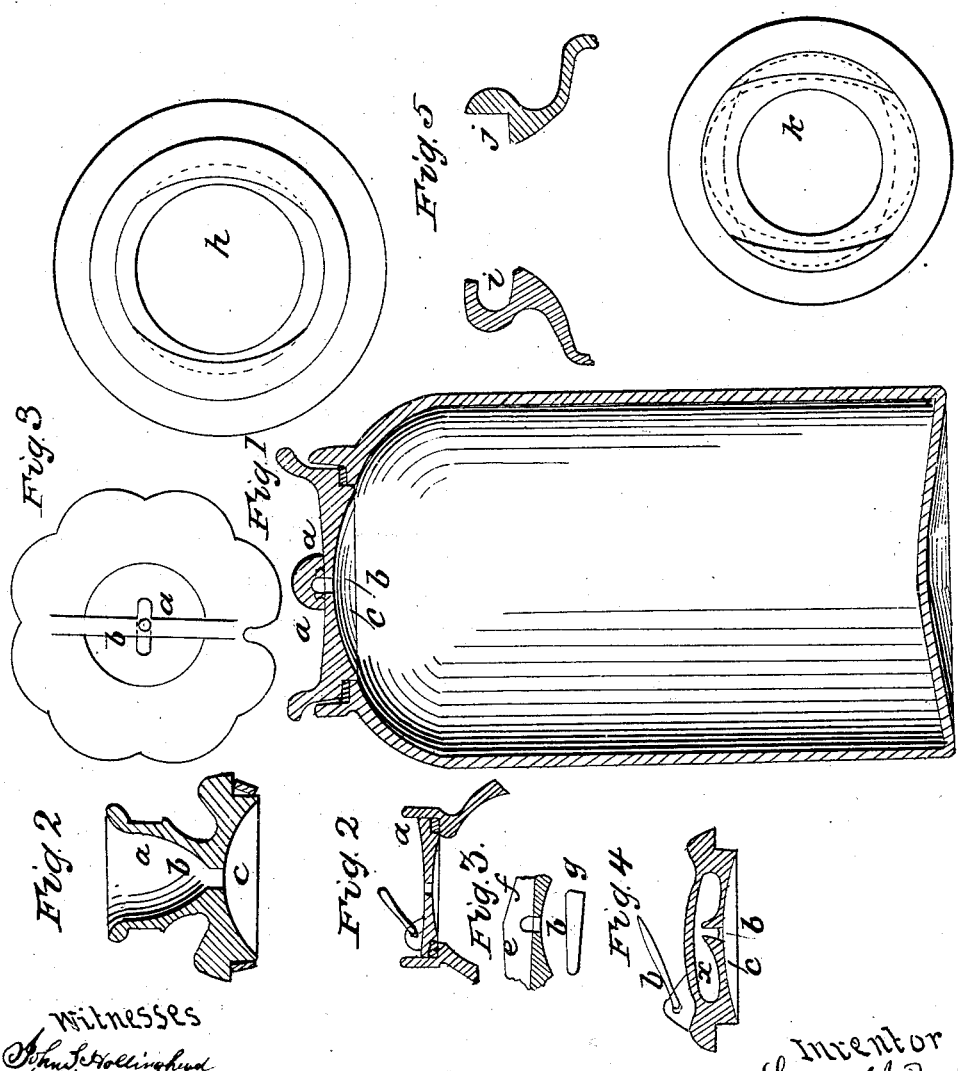
Witnesses
John S. Hollinghead
John D. Sloon
Inventor
Samuel J. Parker

UNITED STATES PATENT OFFICE.

SAMUEL J. PARKER, OF ITHACA, NEW YORK.

IMPROVEMENT IN PRESERVING FRUIT IN JARS, &c.

Specification forming part of Letters Patent No. 41,392, dated January 26, 1864.

*To all whom it may concern:*

Be it known that I, SAMUEL J. PARKER, of the town of Ithaca, in the county of Tompkins and State of New York, have invented a Mode of Preventing the Formation of Mold or Fungus in Fruit-Jars, and a Device for Retaining the Covers of Fruit-Jars in Place; and I do hereby declare that the following is a full and exact description thereof, reference being had to the annexed drawings, and to the letters of reference marked thereon, in which—

Figure 1 is a section of my fruit-jar; Fig. 2, a section of my cover; Fig. $2^a$, a section of a flat cover; Figs. 3, a top view of another of my shapes and a form of fastening the rubber plug in the aperture of the jar. Fig. 4 is a section of another form of my cover for gases and volatile fluids, and Figs. 5 are views of my way of locking my covers when I see fit to use it.

My objects are twofold: first and mainly, to fill the space always formed in the jar as the contents are cooling with fluid, thus preventing any vacant space in which mold or fungus can grow; also, whenever I see fit, to fill the vacant space left by the cooling with gases in which mold or fungus cannot grow, or with vapor having the same effect; second, to lock the cover, when desirable, by a durable and easily-adjustable device.

The first and main object I accomplish by a cup in the cover, of any convenient size, with an aperture in the bottom of it. Having heated the fruit as is ordinarily done, I put it into the jar and adjust the cover, leaving the aperture of the cup open. I then fill the cup either with boiled water, boiled sirup, or the boiled juice of the fruit. As the jar cools the fruit contracts, and the fluid in the cup descends into the jar through the aperture. At intervals, if necessary, I refill the cup; and when the jar is cold and the contents have fully contracted I close the aperture by an india-rubber plug. Thus no space is left unfilled in the jar, and mold can find no place in which to grow. As a modification of this my first and main object, I also make a cover with a cavity blown in it, with a trap-neck about an opening into the inside of the jar, so as to retain gas or fluid. The fruit having been placed in the jar and the cover is about to be placed in position on the jar, I put gas into the cavity in the stopper—as chlorine, hydrogen, or a few drops of chloroform, alcohol, or other easily volatile fluid—and then close the jar, and as it cools the gas or vapor expands and fills or is diffused in the vacuum caused by the contraction of the contents, and thus mold is prevented.

My second and last object is to lock or secure the cover. Metal apparatus is liable to rust; hence I prefer glass, earthen, or stone ware for my jars and covers. Appliances made of glass, earthen, and stone ware are very liable to fracture. The fragments inside of the jar mix with the contents. My improvement is a specific one. By rounding the forms of the neck and cover, no angles to be broken off exist; and, as least liable to these accidents, I have invented the oval-shaped stopper, combined with an oval opening of the upper lip of the mouth, and large and rounded lugs on the cover. This opens and closes readily, and by a half-way turn is locked, and the reverse opens the jar. This is apparent in the drawings.

Fig. 1 is a section of my jar. In it $a\,a$ is the cup, and $b$ the aperture, and $c$ the concavity in the cover to facilitate the complete filling of the jar with fluid.

Fig. 2 is a section of a cover, where the same letters refer to the same parts; but the cup serves as a handle by which to open and close the jar.

Fig. $2^a$ is a flat cover with the usual rubber packing, and the side of the neck of the jar makes a part of the cup.

Figs. 3 show a flat stopper that covers the top of the whole jar, with a large cup and a perpendicular bar dividing the cup into two parts. The aperture is beneath this bar, and by a horizontal hole opens into each side of the cup, and thus the aperture is T-shaped; and when the jar is cool the aperture is closed by a horizontal plug through the upper part of the T-shaped aperture. The same idea of forcibly retaining the plug is seen in Fig. 1 by the knob $d$, screwed over it.

Fig. 4 is a section of the stopper, with a cavity, $x$, in it to contain gas or fluid. The aperture $b$ has trap-shaped edges. The ring $l$ is to pull the stopper out by.

In Figs. 5, $h$ is a downward view into the oval opening above the jar-mouth. The mouth is seen to be circular, with a round space above, which extends under the side projections above the mouth, as is seen by the dotted lines. At *i* is a profile of the mouth, the rounded space above the mouth, and the projection or lip above the mouth. At *j* is the form of the ends of the oval opening. At *k* the dark lines show how the oval stopper enters, and at a half-turn is locked, as is seen by the red lines, and the reverse motion releases the stopper.

I have described and explained my invention so as to enable those skilled in the art to which it appertains to make and use the same.

I am aware that apertures for air-pumps and other purposes have been in use, and also devices to lessen the vacuum-pressure; but I am not aware of any device that has any relation to that part of my invention that prevents the formation of mold; and the amount of skill expended on devices to retain in place the stopper of fruit-jars is quite beyond its importance and too numerous to be named.

The principles of my locking apparatus are not new.

I claim—

1. The prevention of mold in fruit-jars by any apparatus by which a liquid or fluid is let in and made to fill completely the inside of the jar as it cools.

2. A total or partial filling of the cavity, always formed by the cooling of the contents of a fruit jar, by gases or vapors of easily-volatile and expansive fluids, when the said gases or liquids are contained in any suitable cavity or apparatus, as described.

3. As a new device in fruit-jars, the special oval opening of the lip above the mouth or neck of the jar, and the side crescent-shaped inverted edges of the same, in combination with an oval-shaped stopper.

SAMUEL J. PARKER.

Witnesses:
JOHN S. HOLLINGSHEAD,
JOHN D. BLOOR.